L. DAROZIR.
Ice Sled.

No. 98,474.  Patented Jan. 4, 1870.

Witnesses  Inventor
Thos. H. Dodge  Levi Darozir
Geo. H. Miller

United States Patent Office.

LEVI DAROZIR, OF WORCESTER, MASSACHUSETTS, ASSIGNOR TO HIMSELF AND NAPOLEON NALETTE, OF SAME PLACE.

Letters Patent No. 98,474, dated January 4, 1870.

IMPROVEMENT IN ICE-SLEDS.

The Schedule referred to in these Letters Patent and making part of the same

*To all whom it may concern:*

Be it known that I, LEVI DAROZIR, of the city and county of Worcester, and Commonwealth of Massachusetts, have invented certain new and useful Improvements in Ice-Sleds; and I do hereby declare the following to be a full and exact description of the same, reference being had to the accompanying drawings, forming part of this specification, and in which—

Figure 1:
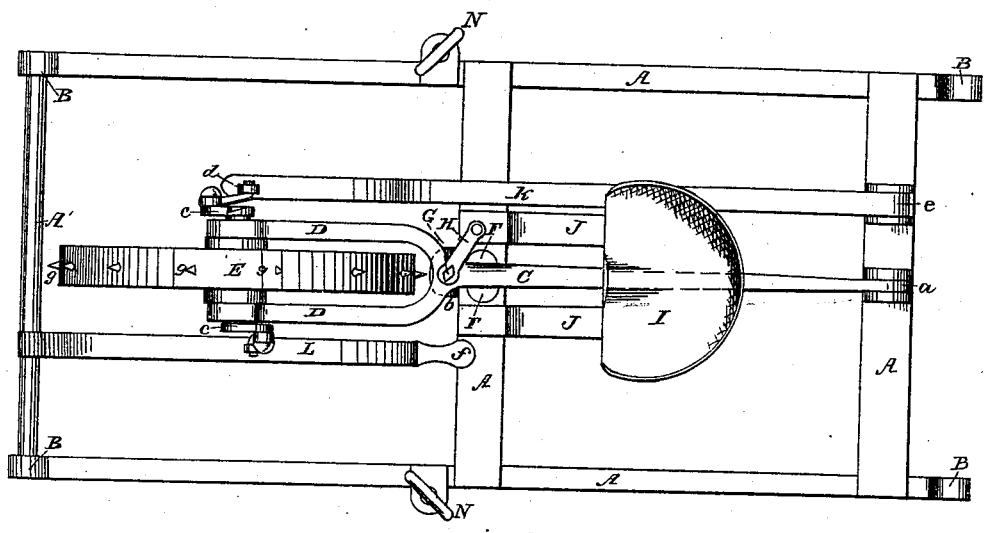
Figure 1 represents a top or plan view of my improved sled.
Figure 2:
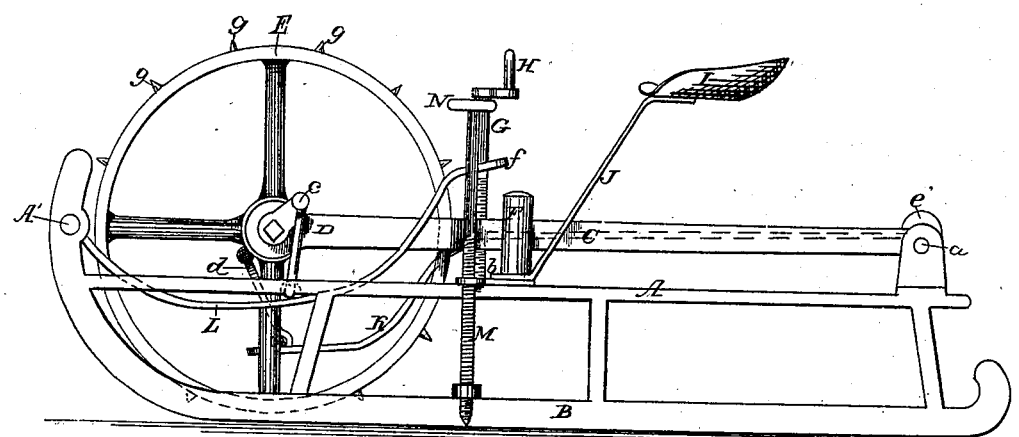
Figure 2 represents a side view of the same.

To enable those skilled in the art to which my invention belongs, to make and use the same, I will proceed to describe it more in detail.

The nature of my invention consists—

First, in the peculiar manner of combining the propelling-wheel with the sled, as hereafter explained;

Second, in the peculiar manner of combining and arranging the operating-treadles, with respect to the frame, wheel, and seat, as hereafter explained; and Third, in the combination, with the sides of the sled, of guiding-screw shafts or spindles, as hereafter explained.

In the drawings, the part lettered A is the sled-frame, supported by the runners B B.

To the rear cross-piece of the frame is hinged the rear end of the wheel-frame C, the front end being forked, as shown at D D, and between which forks, the wheel E is fitted to turn, its journals being supported in suitable bearings, in the ends of the forks D D.

The frame C can rise and fall on its hinge or pivot, *a*, while it is held from lateral play by a slotted guide-piece, F, fastened to the centre cross-piece of the frame A.

A screw-shaft, G, passes down through the frame C, with its point resting on a projection or lip, *b*, on the frame A.

The upper end of the shaft is provided with a crank, H, whereby the frame C can be raised and lowered by the rider, as he sits on the seat I, which is supported by the springs J J, fastened to the cross-piece of the frame A.

The journals of wheel E extend through the ends of the forks D D, and are provided with cranks *c c*, to one of which the front end of a long foot-treadle, K, is connected by the connection-rod *d*, the rear end of the treadle being hinged, at *e*, to the rear end of frame A.

The other crank is similarly connected to the centre of a short foot-treadle, L, the front end of which is looped around the front cross-piece A', which connects the front ends of the runners B B, while the rear end of the treadle extends back and up, and is provided with a foot-piece, *f*.

Upon each side of the sled is arranged a guiding-screw spindle or shaft, M, having a crank, N, at the top.

The operation is as follows:

The rider, being seated upon the seat I, places his feet upon the treadles K and L, and gives the wheel E a rapid motion. At the same time, by means of the crank H, he lowers the frame C, so as to allow the wheel to press, with the desired force, upon the ice. As the spurs *g* enter the ice, and prevent the wheel from slipping, the sled will be propelled with great velocity over the ice. To guide or turn the sled to the right or left, the right or left screw-spindle M is turned down, to let its point enter the ice. The rider can, by means of the screw-shaft G, lift the wheel E, so that it will not touch the ice.

If preferred, two long foot-treadles, K, may be used; but I prefer one short one, as shown, since the driver can rest one foot in a natural position on the cross central piece A, when he desires to propel the wheel by means of the treadle K alone, for the time being.

I am aware that guiding-pins or shafts have before been used on sleds, and I do not broadly claim the employment of such devices; but, in the present instance, the guiding-shafts M are formed with screws, and provided with cranks, by which they may be adjusted and operated with the greatest nicety and facility, without the use of springs, or like devices, which are at all times, but especially in cold weather, extremely liable to be injured or broken.

Having described my improvements in ice-sleds,

What I claim therein as new, and of my invention, and desire to secure by Letters Patent, is—

1. The combination, with the frame A and runners B B, of the hinged frame C and propelling-wheel E, said part being constructed and arranged substantially as and for the purposes described.

2. The combination, with the sides of the sled, of the guiding-crank screw-shafts M M, provided with cranks N N, substantially as and for the purposes described.

3. The combination, with the sled-frame and the hinged frame C, of the screw-shaft G, substantially as and for the purposes set forth.

4. The combination, with the sled-frame, and the hinged frame C, and wheel E, of the foot-treadles K and L, arranged substantially as and for the purposes set forth.

LEVI DAROZIR.

Witnesses:
THOS. H. DODGE,
GEO. H. MILLER.